US010799965B2

(12) United States Patent
Shiel et al.

(10) Patent No.: US 10,799,965 B2
(45) Date of Patent: Oct. 13, 2020

(54) EXTENDABLE RAILS FOR TABLE SAW

(71) Applicants: Robert Bosch Tool Corporation, Broadview, IL (US); Robert Bosch GmbH, Stuttgart (DE)

(72) Inventors: William J. Shiel, Bartlett, IL (US); Eric Laliberte, Naperville, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/948,686

(22) Filed: Apr. 9, 2018

(65) Prior Publication Data
US 2019/0308258 A1 Oct. 10, 2019

(51) Int. Cl.
*B23D 47/02* (2006.01)
*B27B 27/10* (2006.01)
*B27B 27/02* (2006.01)
*B23D 45/06* (2006.01)

(52) U.S. Cl.
CPC .......... *B23D 47/025* (2013.01); *B23D 45/062* (2013.01); *B27B 27/02* (2013.01); *B27B 27/10* (2013.01)

(58) Field of Classification Search
CPC ...... B23D 47/02; B23D 47/025; B27B 27/00; B27B 27/02; B27B 27/08; B27B 27/10; B27B 27/04
See application file for complete search history.

(56) References Cited

U.S. PATENT DOCUMENTS

| 753,791 | A | * | 3/1904 | Fulghum | E04F 15/04 144/354 |
| 1,048,596 | A | * | 12/1912 | Sedaj | A47B 1/04 108/69 |
| 4,377,099 | A | * | 3/1983 | Howe | B23D 47/025 83/438 |
| 4,677,920 | A | * | 7/1987 | Eccardt | B23D 47/025 108/152 |
| 4,964,450 | A | | 10/1990 | Hughes et al. | |
| 5,836,365 | A | | 11/1998 | Derecktor | |
| 6,006,486 | A | * | 12/1999 | Moriau | B27F 1/06 52/589.1 |

(Continued)

FOREIGN PATENT DOCUMENTS

DE 102004017420 A1 * 11/2005 ........... B23D 45/021

*Primary Examiner* — Jennifer B Swinney
(74) *Attorney, Agent, or Firm* — Maginot, Moore & Beck LLP

(57) ABSTRACT

A table saw includes a working surface and a rail system. The rail system includes stationary rails mounted along the working surface, and extension rails. The rails each include matching guide surfaces extending along the longitudinal axis and configured to support and guide a rip fence. The rails have a common connection interface that in each case includes a connecting end and a supporting end, such that the extension rails are mountable with the stationary rails. When mounted, the guide surfaces of the extension rails extend the guide surfaces of the stationary rails. The connecting end in the common connection interface includes a connection mechanism configured to urge the connecting end together with the supporting end to form an internal connection, and to align the guide surfaces of the connected rails to as to be co-planar with each other.

11 Claims, 7 Drawing Sheets

(56) References Cited

U.S. PATENT DOCUMENTS

| | | | |
|---|---|---|---|
| 8,418,591 B2* | 4/2013 | Frolov | B23D 47/025 144/287 |
| 2004/0187666 A1* | 9/2004 | Huang | B23D 45/06 83/477.2 |
| 2004/0211143 A1* | 10/2004 | Hanning | E04F 15/02 52/578 |
| 2005/0092155 A1* | 5/2005 | Phillips | B23D 45/068 83/581 |
| 2006/0101966 A1 | 5/2006 | Garcia et al. | |
| 2009/0165624 A1 | 7/2009 | Brown et al. | |
| 2010/0276910 A1* | 11/2010 | Wise | B25H 1/04 280/651 |
| 2015/0273723 A1 | 10/2015 | Gass et al. | |

* cited by examiner

EXTENDABLE RAILS FOR TABLE SAW

TECHNICAL FIELD

This disclosure relates to table saws, and more particularly to rip fence guide rails for table saws.

BACKGROUND

Table saws of various designs include a frame and an upper working surface having an opening through which a blade extends. The working surface supports a workpiece, such as wood, as it is pushed towards the blade for cutting. Table saws have traditionally been stand-alone pieces of equipment that are used in workshops. Because most stand-alone table saws are used in large open spaces, the dimensions of the table saw can be large enough to support materials of various sizes for cutting. Tables that are used in workshops are not readily moved from one location to another. At construction sites, it is useful to have a table saw that can be easily moved from one location to another or between different construction sites. Accordingly, smaller and portable "jobsite" table saws have been designed. These table saws generally use lighter materials and have reduced the dimensions of the frame and the working surface to reduce the size and weight of the table saw, thereby creating the desired portable table saw.

Conventional table saws, including jobsite table saws, generally include a movable rip fence used to guide a workpiece as it is pushed towards the blade for cutting. The movable rip fence is generally designed to span between the front and rear edges of the upper surface. The rip fence can be secured in position a given distance from the blade and is arranged to be generally parallel to the blade. When the rip fence is secured in a position, the workpiece can be pushed against the side of the rip fence to slide on the working surface to be cut by the blade. Thus, accurate and straight cuts can be made.

Various methods of moving and securing a rip fence relative to the blade have been developed. In one example, a portion of the rip fence is received in a slot in the upper surface of the table saw, so that the rip fence can slide on the upper surface along a direction perpendicular to the blade. In another example, the table saw includes one or more rails, and the rip fence is slidably mounted on the rails.

Generally, the extent of the slot or rails is limited by the dimensions of the upper surface of the table saw. The maximum extent possible between the blade and the rip fence defines the "ripping capacity" of the table saw, i.e. the maximus width to which accurate cuts on a workpiece can be made. Since the working surface of jobsite table saws is generally reduced relative to traditional table saws, jobsite table saws generally have a reduced ripping capacity relative to traditional table saws. However, a larger ripping capacity would be beneficial for many jobsite applications.

Several techniques for extending the ripping capacity of jobsite table saws have been developed. In one example, a jobsite table saw includes rails that are movable from a central position along the front and the rear sides of the table. In a first operating state, the rails are centered on the upper surface, and the rip fence can be moved along the rails for low rip capacity positioning. In a second operating state, the rip fence is locked in place on the rails to maintain a parallel orientation with the blade, and then the rails are slid along the sides of the upper surface in a direction perpendicular to the blade. This moves the rip fence further away from the blade, and thus extends the ripping capacity. With the rails extended, however, the rip fence cannot be moved to make different sized cuts without impacting the alignment of the rip fence with the blade. This results in a multiple step process changing both the rails and the rip fence to change between different size rips. Slidable rails are also limited in total rip capacity and transportable saw size, since the rails in the central position must fit on the table saw.

In another example, extension rails are connected to stationary rails via hinges, so that the extension rails can be unfolded to increase the effective ripping capacity of the table saw. The hinge joint, however, not only adds complexity to the system (such hinged rails typically require additional locks for transport), but also may impact the accuracy of the alignment of the rip fence as it slides along the rail. Such extensions are also limited in total rip capacity, since the hinge portion can only be as long as the table itself.

In a further example, the rails of a table saw include telescoping portions that extend outwards in a direction perpendicular to the blade. Such telescoping rails, however, limit the types of rip fences usable with the table saw, since the rip fence would need a dual guide system capable of sliding along the differently sized fixed and telescoping portions of the rail. The fixed and telescoping portions also each have respective size tolerances. Since the telescoping portions are mounted with the fixed portions, the tolerances add up, with the result that the accuracy of the alignment of the rip fence with the saw blade may not be maintained. The size of the telescoping portion is also limited by the size of the table.

In another example, separate rail extensions connect to the ends of stationary rails on the front and rear of the table saw. In some instances, the extensions are connected to the stationary rails via clamps, latches, or the like. In one instance, the stationary rails and extension rails have hollow ends. Opposing wedge shapes are positioned so as to be partially within the hollow end of the stationary rail, and partially within the hollow end of the extension. A screw is threaded into a hole in the extension so as to move one of the wedge shapes toward the other. Due to the opposing wedge shapes, the motion causes the wedge shapes to push out on the inner surfaces of the hollow ends and hold the extension in place relative to the stationary rail. In some instances, extension rails include additional support legs or an additional work surface for supporting a workpiece.

The extension rail examples discussed above, however, may not maintain the alignment of the rip fence with the blade. Specifically, the extension rails may not be accurately mounted so as to properly line up with the stationary rails. Moreover, even if properly aligned, the joint between the extension rail and the stationary rail may interfere with the alignment between the extension rail and the stationary rail. Therefore, a technique for mounting an extension rail to a table saw without interfering with the alignment of the rip fence would be beneficial.

Further, since the extension rails are separate pieces that are detached during transport of the table saw, such extension rails add to the complexity, difficulty, and expense of setting up and packing up a jobsite. Therefore, extension rails that are easy to transport and store would also be beneficial.

SUMMARY

The following is a brief summary of subject matter described in greater detail herein. This summary is not intended to be limiting as to the scope of this disclosure or to the claims.

Rails for a rip fence of a table saw, in particular a jobsite table saw, have a common connection scheme for joining rails together. In each case, a connecting end of a rail is mounted with a supporting end of another rail to form an internal connection therebetween. The internal connection is formed by a connection mechanism that urges adjacent rails toward each other and aligns the rails so that guiding surfaces on the rails are co-planar. Mounting extension rails onto stationary rails that are fixed to the table saw expands a ripping capacity of the table saw.

An exemplary embodiment of a rail for a table saw includes a first guide surface, a first connecting end, and a connection mechanism. The first guide surface extends along a longitudinal axis. The connection mechanism is configured to urge the first connecting end together with a supporting end of a further rail to form an internal connection such that the rail is mounted with the further rail. The connection mechanism is further configured to align the first guide surface so as to be co-planar with a further guide surface of the further rail.

In some embodiments, the rail further includes an internal support member extending along the longitudinal axis. The connection mechanism includes a locking member positioned within the first connecting end, and an actuator operable to move the locking member toward and away from the internal support member.

In some embodiments, the internal support member is configured to support the first connecting end of the extension rail on the supporting end of the further rail. The locking member has a convex locking head with a first convex portion facing inwards from the first connecting end, and a second convex portion facing outwards from the first connecting end. The first convex portion is configured to engage a first concave portion of a concave notch of the supporting end of the further rail to transform the motion of the locking member toward the internal support member into a longitudinal motion of the rail toward the further rail. The second convex portion is configured to engage a second concave portion of the concave notch of the further rail to delimit an extent of the longitudinal motion of the rail toward the further rail, such that the supporting end of the further rail is clamped between the locking head and the internal support member.

In some embodiments, the rail further includes a first supporting end opposite the first connecting end. The first supporting end is configured to receive a first connecting end of an additional rail similarly configured to the rail and engage with a connection mechanism of the additional rail, so that the rail is mountable in series with the further rail and the additional rail.

In some embodiments, the first supporting end is configured to receive an internal support member of the additional rail, and includes a concave notch. The concave notch includes a third concave portion facing inwards from the first supporting end and configured to engage with a first convex portion of a locking head of the additional rail, and a fourth concave portion facing outwards from the first supporting end and configured to engage with a second convex portion of the locking head of the additional rail.

In some embodiments, the rail further includes a first supporting end opposite the first connecting end. The first supporting end is configured to receive a first connecting end of an additional rail similarly configured to the rail and engage with a connection mechanism of the additional rail, so that the rail is mountable in series with the further rail and the additional rail.

In some embodiments, the first guide surface is configured to guide and support a rip fence.

An exemplary embodiment of a rail system for table saw rails includes a first rail and a second rail. The first rail includes a first guide surface extending along a longitudinal axis, and a first supporting end. The second rail includes a second guide surface matching the first guide surface and extending along the longitudinal axis, and a first connecting end having a connecting mechanism. The connecting mechanism is configured to urge the first connecting end together with the first supporting end to form an internal connection, such that the second rail is mounted with the first rail. The connecting mechanism is further configured to align the second guide surface so as to be co-planar with the first guide surface.

In some embodiments, the second rail further includes an internal support member extending along the longitudinal axis. The first supporting end of the first rail is configured to support the internal support member when the second rail is mounted with the first rail. The connection mechanism includes a locking member positioned within the first connecting end, and an actuator operable to move the locking member toward and away from the internal support member.

In some embodiments, the locking member has a convex locking head with a first convex portion facing inwards from the first connecting end, and a second convex portion facing outwards from the first connecting end. The first supporting end has a convex notch with a first concave portion facing inwards from the first supporting end and configured to engage with the first convex portion of the locking head to transform the motion of the locking member toward the internal support member into a longitudinal motion of the second rail toward the first rail. The notch further has a second concave portion facing outwards from the first supporting end and configured to engage with the second convex portion of the locking head to delimit an extent of the longitudinal motion of the second rail toward the first rail, such that the first supporting end is clamped between the locking head and the internal support member.

In some embodiments, the second rail further includes a second supporting end opposite the first connecting end. The second supporting end is similarly configured to the first supporting end of the first rail, such that a further rail having a further connecting end similarly configured to the first connecting end is mountable on the second supporting end so as to be in series with the first and second rails.

In some embodiments, the first guide surface and second guide surface are configured to guide and support a rip fence. The alignment between the first rail and the second rail when the first rail is mounted with the second rail enables the rip fence to maintain an alignment relative to the longitudinal axis when moving between the first guide surface and the second guide surface.

An exemplary embodiment of a table saw includes a working surface, a pair of stationary rails, and a pair of extension rails. The working surface includes a front edge and a rear edge extending along a longitudinal axis, and an opening for a blade oriented perpendicularly to the front and rear edges. The stationary rails are mounted along the front and rear edges of the working surface, respectively. Each stationary rail includes a guide surface extending along the longitudinal axis and configured to support and guide a rip fence. Each extension rail includes a further guide surface matched to the guide surfaces of the stationary rails. The stationary rails and extension rails have a common connection interface that in each case includes a connecting end and a supporting end, such that the extension rails are mountable with the stationary rails so that the further guide surfaces of the extension rails extend the guide surfaces of the stationary rails. The connecting end in the common connection interface includes a connection mechanism configured to urge the connecting end together with the supporting end to form an internal connection, and to align the guide surfaces of the connected rails to as to be co-planar with each other.

In some embodiments, the table saw further includes a support structure that supports the working surface, and that is configured to receive the pair of extension rails when the extension rails are not mounted with the pair of stationary rails.

In some embodiments, the extension rails are connected to the support structure by a flexible tether.

In some embodiments, the pair of extension rails provides support for the working surface when received by the support structure.

In some embodiments, the extension rails are selectively mountable on both longitudinal ends of the stationary rails.

In some embodiments, in the common connection interface, (i) the connecting end further includes an internal support member extending along the longitudinal axis, (ii) the supporting end is configured to support the internal support member, and (iii) the connection mechanism includes a locking member positioned within the connecting end, and an actuator operable to move the locking member toward and away from the internal support member. The locking member has a convex locking head with a first convex portion facing inwards from the connecting end, and a second convex portion facing outwards from the connecting end. The supporting end has a convex notch with a first concave portion facing inwards from the supporting end and configured to engage with the first convex portion of the locking head to transform the motion of the locking member toward the internal support member into a longitudinal motion of the connected rails toward each other The notch further includes a second concave portion facing outwards from the supporting end and configured to engage with the second convex portion of the locking head to delimit an extent of the longitudinal motion of the connected rails, such that the supporting end is clamped between the locking head and the internal support member.

In some embodiments, the table saw further includes at least one further pair of extension rails similarly configured to the pair of extension rails, such that the at least one further pair of extension rails is mountable in series with the pair of stationary rails and the pair of extension rails.

The above presents a simplified summary of this disclosure in order to provide a basic understanding of some aspects of the technologies disclosed herein, and is not an extensive or complete overview of such topics. As such, the summary above does not delineate the scope of this disclosure, and is not intended to identify key or critical aspects of the disclosure. Further details are provided by the detailed description, the claims, and the drawings.

BRIEF DESCRIPTION OF THE DRAWINGS

FIGS. 2-5 depict side views of an exemplary embodiment of a connection interface between rails for a table saw according to this disclosure.

DETAILED DESCRIPTION

For the purposes of promoting an understanding of the principles of the features described herein, reference is now made to the drawings and descriptions in the following written specification. No limitation to the scope of the subject matter is intended by the references. This disclosure also includes any alterations and modifications to the illustrated features and includes further applications of the principles of the described features as would normally occur to one of ordinary skill in the art to which this document pertains.

Figure 1A:
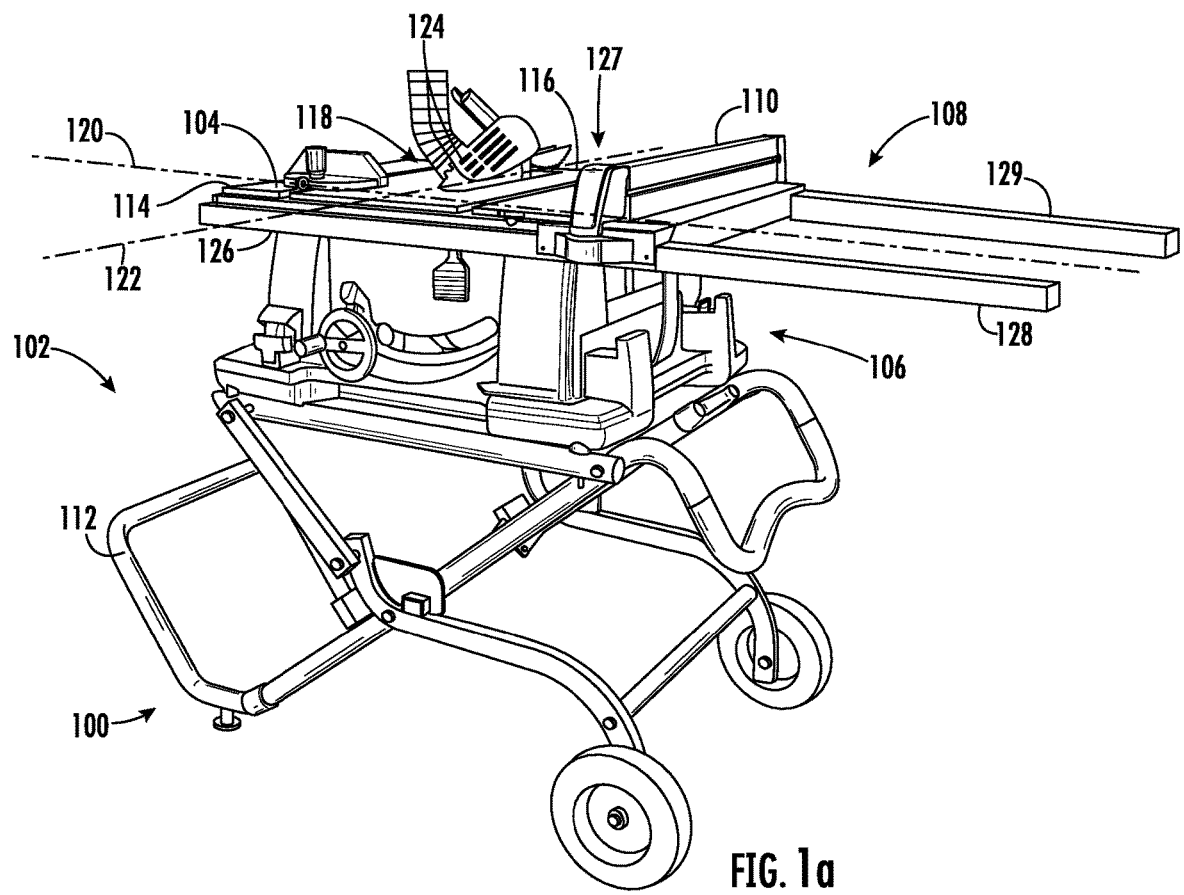
FIG. 1a depicts a perspective view of an exemplary embodiment of a table saw according to this disclosure.
Figure 1B:
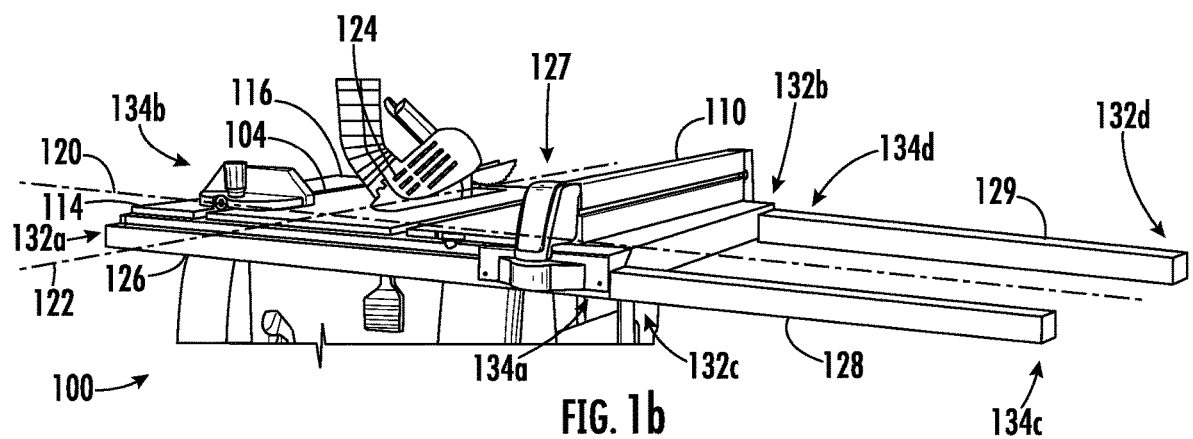
FIG. 1b depicts a detail perspective view of the table saw from FIG. 1.

FIG. 1a depicts a perspective view of an exemplary embodiment of a table saw 100 according to this disclosure, and FIG. 1b depicts a perspective detail view of the table saw 100. As depicted in FIG. 1a, the table saw 100 includes a support structure 102, a working surface 104, a cutting mechanism 106, a rail system 108, and a rip fence 110. In some embodiments, the table saw 100 is a jobsite table saw. Other types of table saws are also contemplated in other embodiments.

The support structure 102 includes legs 112 and supports the working surface 104. The working surface 104 has a front edge 114, a rear edge 116, and a blade opening 118. The front and rear edges 114 and 116 are parallel with each other and extend along a longitudinal axis 120. The blade opening 118 extends along a cutting axis 122 that is perpendicular to the longitudinal axis 120. The cutting mechanism 106 includes a blade 124 configured to extend up out from the blade opening to cut a workpiece fed along the cutting axis 122.

The rip fence 110 is selectively movable along the rail system 108 and securable in place at a desired position along the longitudinal axis 120 so as to be aligned substantially in parallel with the blade 124. The longitudinal spacing between the rip fence 110 and the blade 124 defines a settable ripping capacity of the table saw 100. The rip fence 110 is configured to guide the workpiece along the cutting axis 122 as the workpiece is fed past the blade 124. In some embodiments, the rip fence 110 is removable from the rail system 108. In some embodiments, the rip fence 110 is held captive on the rail system 108.

The rail system 100 includes a plurality of rails that are joined together by mounting a connecting end of one rail on a supporting end of another. In this embodiment, the rail system 108 includes four rails 126, 127, 128, and 129. In other embodiments, the rail system 108 includes any number of rails. In this embodiment each rail 126-129 includes a respective connecting end 132a-d and a respective supporting end 134a-d. In other embodiments, some rails have two connecting ends, two supporting ends, or only one of a connecting end and a supporting end. One or more faces of each rail 126-129 defines a respective guide surface for that rail. Such guide surfaces are configured to engage with the rip fence 110 so that an alignment of the rip fence 110 with the blade 124 is maintained when the rip fence 110 is moved long the rails 126-129.

The rails 126 and 127 are stationary rails, and are mounted along the front edge 114 and rear edge 116, respectively, so that the guide surfaces of the rails 126 and 127 extend along the longitudinal axis 120 of the table saw 100. In some embodiments, the stationary rails 126 and 127 are integral with the working surface 104. In some embodiments, the stationary rails 126 and 127 are separate elements affixed to a portion the table saw 100, such as the working surface 104 or the support structure 102. In some embodiments, the stationary rails 126 and 127 are removable from the table saw 100.

The rails 128 and 129 are extension rails mounted on the stationary rails 126 and 127 so that the guide surfaces of the rails 128 and 129 are aligned with and extend the guide surfaces of the rails 126 and 127 in a co-planar fashion, and so that the alignment of the rip fence 110 with the blade 124 is maintained when the rip fence 110 is moved between the stationary rails 126, 127, and the extension rails 128, 129. The extension rails 128 and 129 have a shape matched to the shape of the stationary rails 126 and 127, so that the guide surfaces of the rails 128 and 129 match the guide surfaces of the rails 126 and 127. Matching guide surfaces enable a rip fence 110 to move between the stationary rails 126, 127 and the extension rails 128, 129 without requiring a secondary guide portion. In some embodiments, the shape of the extension rails 128 and 129 is not matched with the shape of the stationary rails 126, 127, such that the rail system 108 is configured for a rip fence having a dual guide configuration.

In this embodiment, the supporting end 134a of the stationary rail 126 is aligned along the longitudinal axis with the connecting end 132b of the stationary rail 127, and the connecting end 132a is aligned with the supporting end 134b. In some embodiments, different ends of the stationary rails 126, 127 are aligned, and in some embodiments, the ends of the stationary rail 126 are offset along the longitudinal axis from the ends of the stationary rail 127. The connecting end 132c of the extension rail 128 is mounted with the supporting end 134a of the stationary rail 126, and the connecting end 132b of the stationary rail 127 is mounted with the supporting end 134d of the extension rail 129. Other ends are connected to each other in other embodiments. Each mounting of a connecting end with a supporting end forms an internal connection between the corresponding rails, as discussed in further detail below.

In some embodiments, the rails 126-129 each includes a respective scale that extends along the longitudinal axis 120. Scales enable a user to measure a distance between the blade 124 and the rip fence 110 in order to set the ripping capacity of the table saw 100. The longitudinal position of the blade 124 corresponds to a zero measurement on the scales 136a and 136b on the stationary rails 126 and 127, such that measurements on the scale directly correspond to settable values of the ripping capacity of the table saw 100.

In some embodiments, each of the stationary rails 126 and 127 includes a respective scale, and the longitudinal position of the rip fence 110 on each of the rails 126 is independently measurable. Measuring the position of the rip fence 110 on each rail 126, 127 enables a user to determine and adjust the alignment of the rip fence 110 relative to the blade 124. For example, independently setting a position of the rip fence 110 on each rail 126 enables a user to account for any variations in dimensions of the rails 126 or rip fence 110. In another example, some cutting operations include setting the rip fence 110 to be slightly askew from the blade 124, such as by about a half-millimeter, in order to account for expansion of the workpiece due to cutting. In other embodiments, only one of the stationary rails 126 and 127 includes a scale. In some embodiments, the scales are integral with or permanently affixed to their corresponding rails 126-129. In some embodiments, the scales are removably mountable on the rails 126-129.

Scales on the extension rails 128 and 129 are similarly configured to the scales on the stationary rails 126 and 127, but have measurements that continue on from a maximum measurement of the scales on preceding rails in the rail system 108, e.g. the stationary rails 126, 127. In other words, when the extension rails 128 and 129 are mounted on the stationary rails 126 and 127 as depicted in FIG. 1, the scales on the rails form a continuous scale demarking the settable ripping capacity of the table saw 100.

Figure 1C:
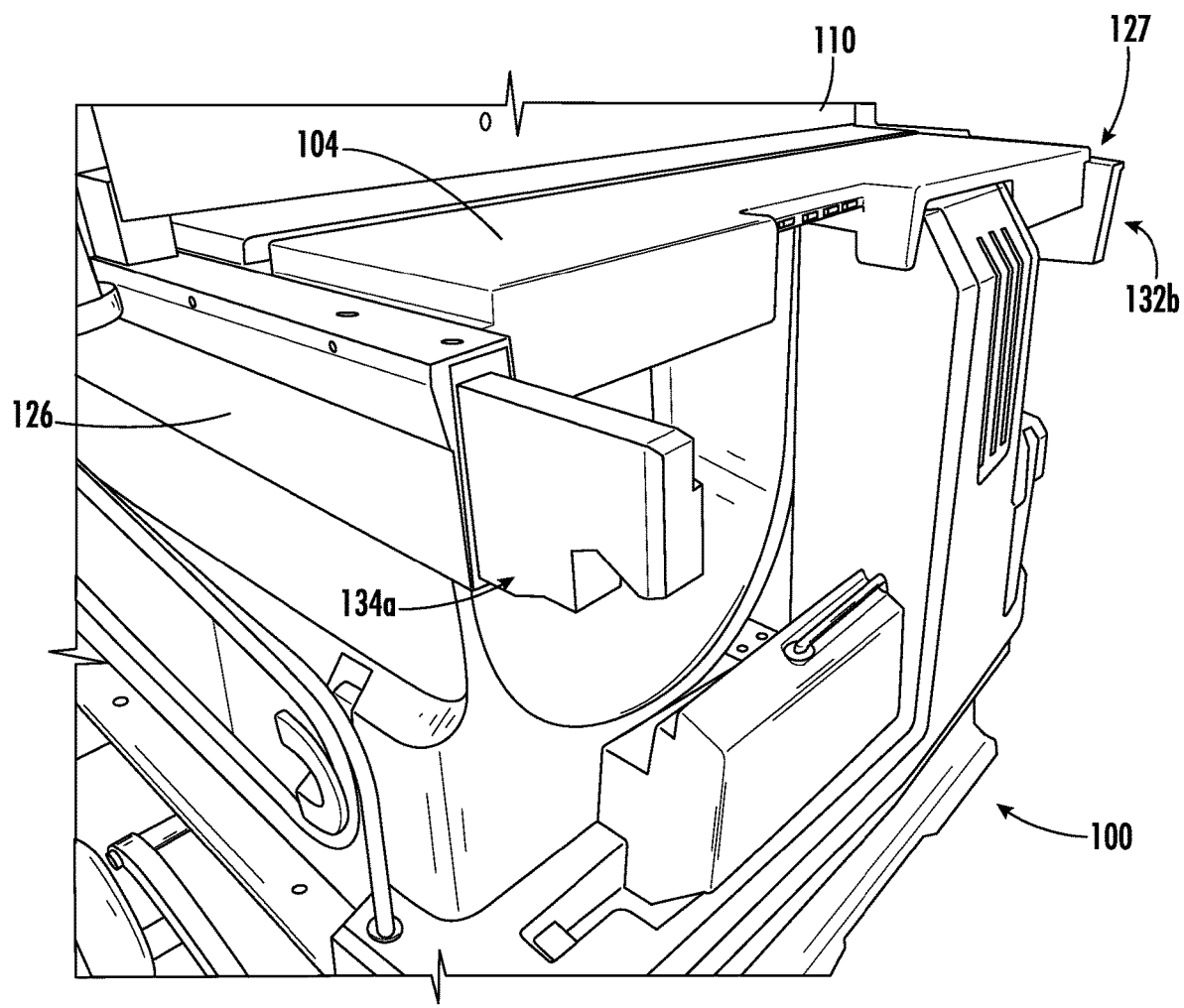
FIG. 1c is a perspective image of the table saw from FIG. 1.

In some embodiments, the rails 126-129 have a rectangular tube shape, and the guide surface of each rail 126-129 includes one or more faces of the rectangular tube shape. In some embodiments, the guide surfaces include a slot in the stationary rails 126-129. In some embodiments, the rails 126-129 have a tubular shape, and the guide surfaces include a portion of an exterior surface of the tubular shape. Other shapes for the stationary rails and other types of guide surfaces are also contemplated in other embodiments. FIG. 1c is a perspective image of the table saw 100 with the extension rails 128 and 129 removed.

FIGS. 2-5 depict side views of an exemplary embodiment of a common connection interface of the type discussed above between a connecting end 138 of a first rail 139 and a supporting end 140 of a second rail 141 that forms an internal connection between the rails 139 and 141. In FIGS. 2-5, a side face of the first rail 139 is not shown in order to depict the interior of the rail 139.

In FIG. 2, the rails 139 and 141 are in an unmounted position. As depicted in FIG. 2, the rail 139 further includes an internal support member 144 positioned within the rail 139 and running along the longitudinal axis 120, and a connection mechanism 150 configured to connect the connecting end 138 to the supporting end 140.

The connection mechanism 150 includes a locking member 152 and an actuator 154. The locking member 152 is positioned within the connecting end 138. The actuator 154 is operable to move the locking member 152 toward and away from the internal support member 144. In this embodiment, the actuator 154 is a screw lever threaded into the connecting end 138, but other acceptable actuators are also contemplated in other embodiments. The locking member 152 includes a convex locking head 158 with a first convex portion 160 facing inwards from the connecting end 138, and a second convex portion 162 facing outwards from the connecting end 138.

The supporting end 140 of the rail 141 includes an upper surface 164 configured to support the internal support member 144 of the rail 139, a concave notch 166, a nose portion 168, and a lip portion 170. The concave notch 166 includes a first concave portion 172 facing inwards from the supporting end 140 and a second concave portion 174 facing outward from the supporting end 140. The nose portion 168 extends outwards from the first concave portion 172 and has a sloped surface 176 that forms a convex shape with the first concave portion 174. The lip portion 170 extends inwards from the second concave portion 174, and includes an edge 178 parallel with the longitudinal axis 120 indented from a lower side 180 of the rail 141.

Figure 3:
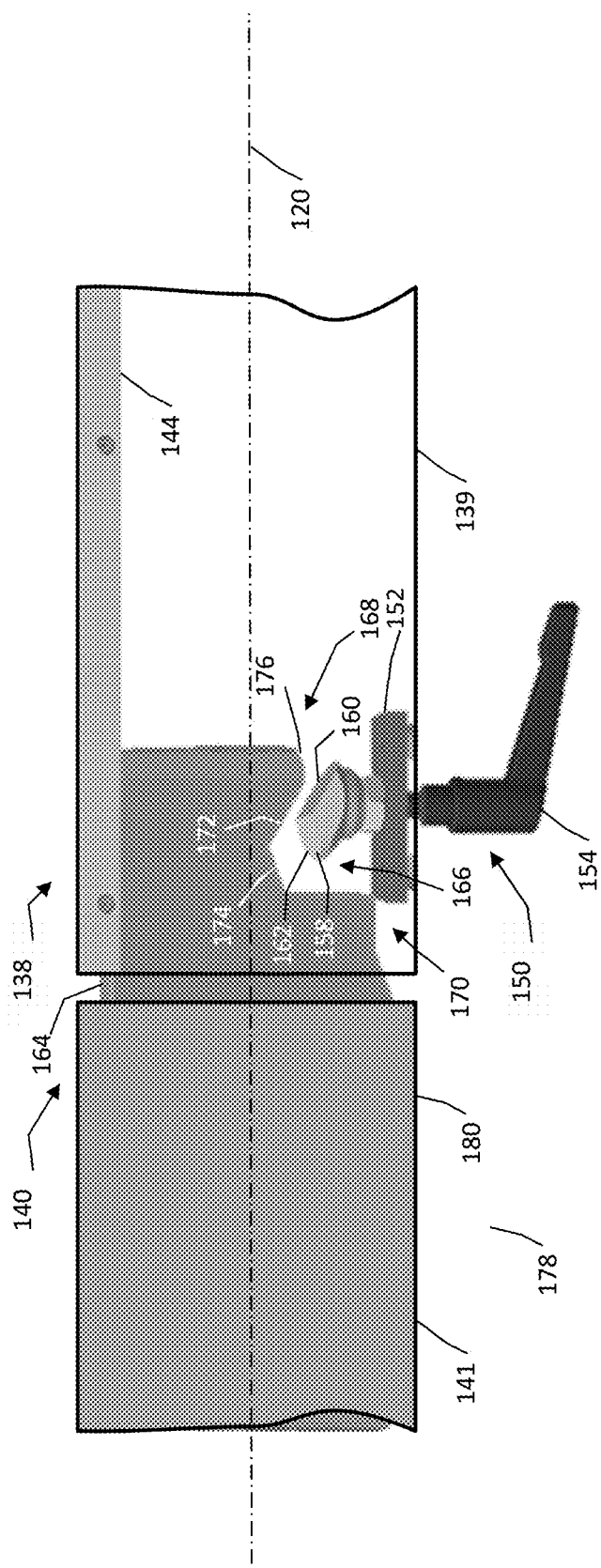

In FIG. 3, the rail 139 is partially mounted with the rail 141. To mount the rail 139 with the rail 141, the rail 139 is moved along the longitudinal axis 120 so that the supporting end 140 of the rail 141 is introduced into the connecting end 138. The internal support member 144 of the rail 139 rests on the upper surface 164 of the supporting end 140 and acts as a guide for moving the rail 139 along the longitudinal axis 120. As the supporting end 140 is introduced further into the connecting end 138, the sloped surface 176 of the nose portion 174 is configured to transition the locking member 152 of the connection mechanism 150 into the concave notch 166 of the supporting end 140.

Figure 4:
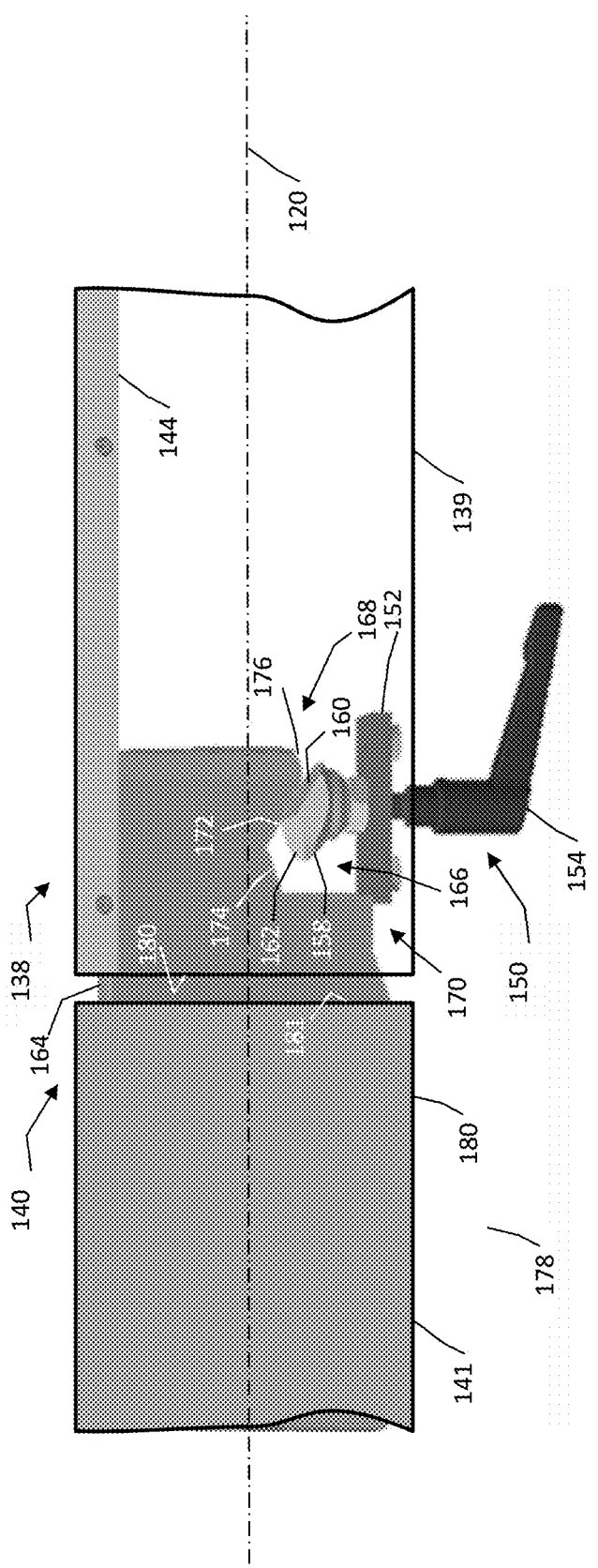

In FIG. 4, the locking member 152 has been moved toward the internal support member 144 by the actuator 154 so that the first convex portion 160 of the convex locking head 158 is in contact with the first concave portion 172 of the concave notch 166. The first convex portion 160 is configured to engage the first concave portion 172 in order to transform further motion of the locking member 152 toward the internal support member 144 into a longitudinal motion of the rail 139 toward the rail 141. In other words, continued operation of the actuator 154 to move the locking member 152 upwards from the positioned depicted in FIG. 4 toward the internal support member 144 causes the first convex portion 160 to bear against the first concave portion 172. Since the first convex portion 160 and the first concave portion 172 are transversely angled relative to the longitudinal axis 120, the first convex portion 160 bearing against the first concave portion 172 forms a resultant force acting along the longitudinal axis 120 that pushes an axial end face 180 the rail 139 and an axial end face 181 of the rail 141 toward each other. In this manner, the connection mechanism 150 is configured to urge the connecting end 138 together with the supporting end 140.

Figure 5:
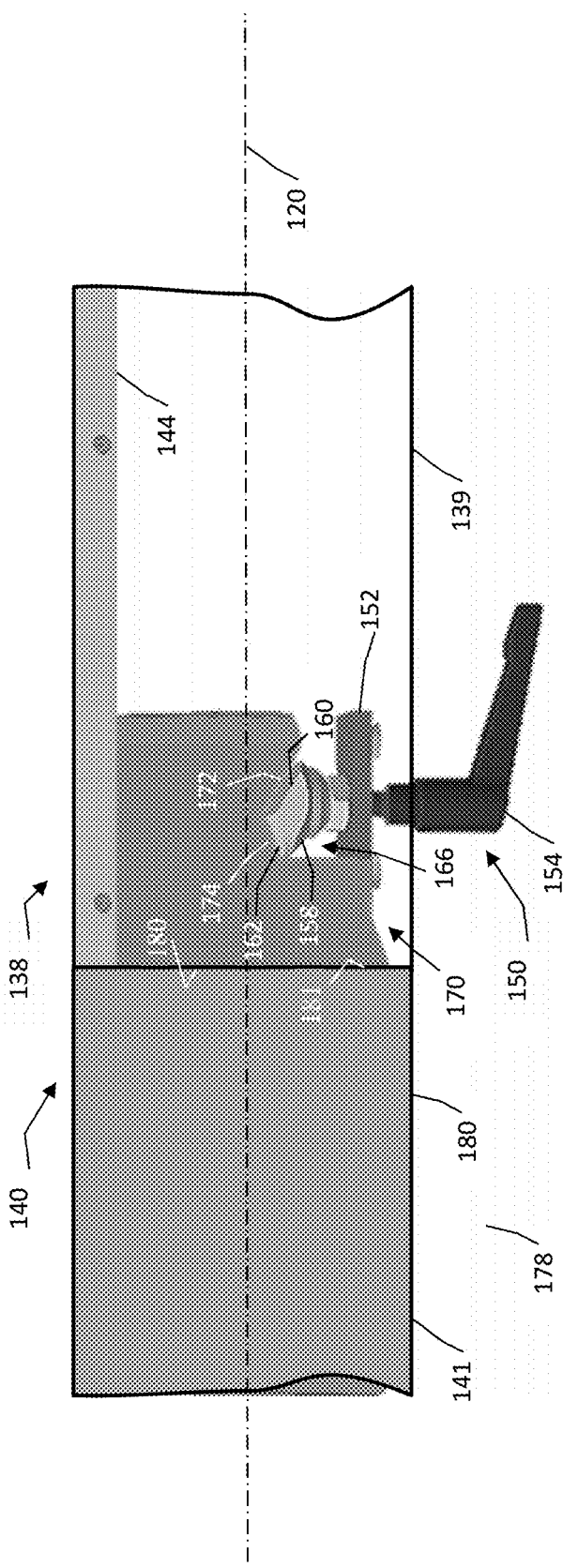

Such longitudinal motion causes the second convex portion 162 of the locking head 158 to move toward the second concave portion 174 of the concave notch 166. In FIG. 5, the rail 139 is mounted with the rail 141. As depicted in FIG. 5, the second convex portion 162 is engaged with the second concave portion 174 so as to delimit an extent of the longitudinal motion between the rail 139 and the rail 141, and so that the axial end faces 180 and 181 press against each other along the longitudinal axis. The supporting end 141 is clamped between the locking head 158 and the internal support member 144. Further operation of the actuator 154 when the locking head 158 is positioned as depicted in FIG. 5 will not result in additional motion of the rail 139 relative to the rail 141, but will increase a clamping force therebetween. The locking head 158, first supporting end 132, and internal support member 144 thus form an internal connection between the rail 139 and the rail 141.

The second convex portion 162 and second concave portion 174 are configured such that when the locking head 158 is at the delimited position as depicted in FIG. 5, the rail 139 is aligned with the rail 141 so that the guide surfaces of the rails 139 and 141 are co-planar with each other. In other words, the connection mechanism 150 ensures that the rail 139 is aligned with the rail 141 regardless of whether the rail 139 was misaligned during mounting. In this manner, the connection mechanism 150 enables the guide surface of the rail 139 to effectively extend the guide surface of the rail 141 along the longitudinal axis 120 so that a rip fence moving between the rails 139 and 141 maintains an alignment relative to the longitudinal axis 120.

Figure 6:
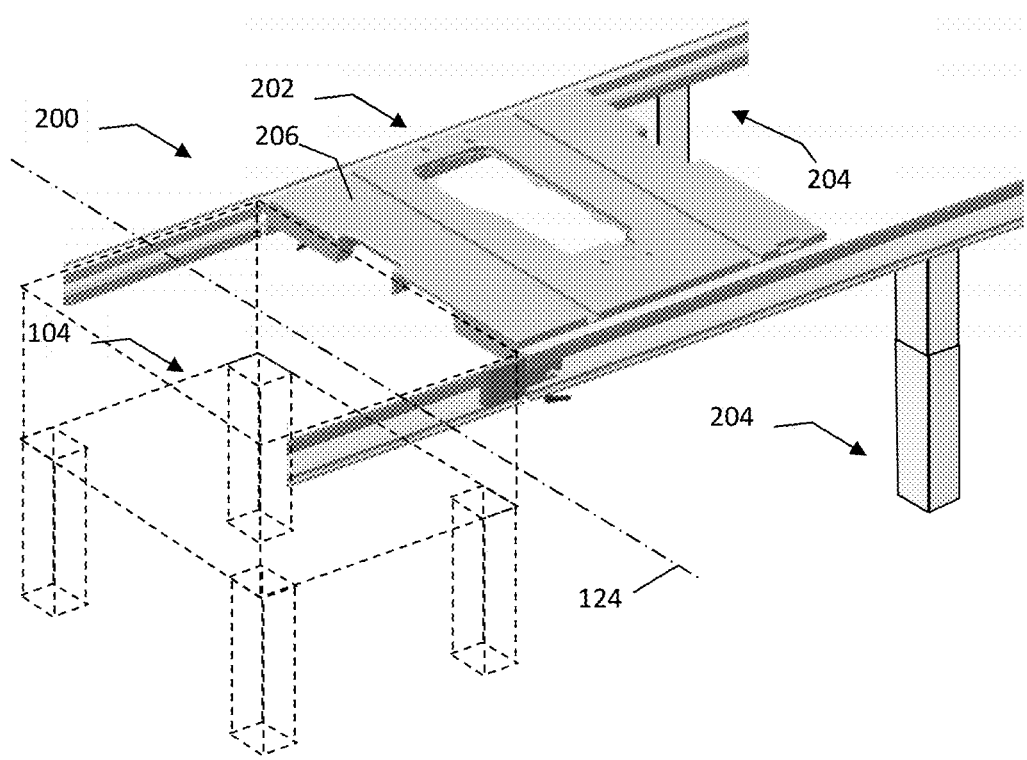
FIG. 6 depicts a perspective view of an exemplary embodiment of extension rails for a table saw according to this disclosure.

In some activities, it is beneficial to include additional support for a workpiece when using extension rails according to this disclosure. FIG. 6 depicts an exemplary embodiment of a pair of extension rails 200 along with an extension table 202 and extension legs 204 in use with a table saw 100. In FIG. 6, the table saw 100 is depicted in a simplified dash-line form in order to more clearly depict other features in this Figure.

The extension table 202 is positioned between the pair of rails 200. In some embodiments, the extension table 202 is removably mountable with the rails 200. In some embodiments, the extension table 202 is slidable along the rails 200. In some embodiments, the extension table 202 is integral with one or both of the rails 200. The extension table 200 includes an extension working surface 206 that is co-planar with the working surface 104 of the table saw 100 when the rails 200 are mounted with the table saw 100. The extension working surface 206 is configured to provide additional support to a workpiece as the workpiece is fed along the cutting axis 124 on the working surface 104.

The extension legs 204 are configured to provide additional support for the extension rails 200. In some embodiments, the extension legs 204 are removably mountable with the extension rails 200. In some embodiments, the extension legs 204 are slidable along the extension rails 200. In some embodiments, the extension legs 204 are integral with the rails 200 or the extension table 202.

Figure 7:
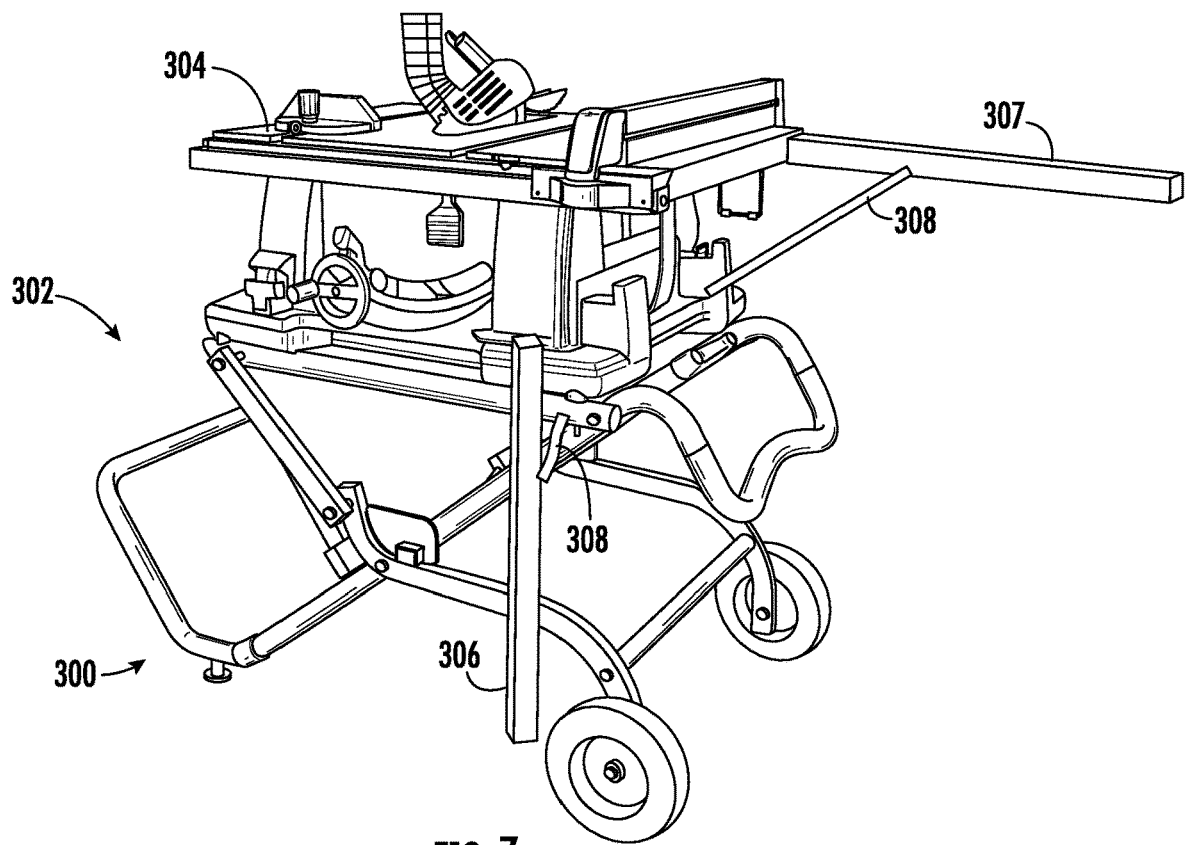
FIGS. 7 and 8 depict perspective views of different exemplary embodiments of table saws according to this disclosure.

FIG. 7 depicts an exemplary embodiment of a table saw 300 according to this disclosure that includes a support structure 302, a working surface 304, a first extension rail 306, a second extension rail 307, and a pair of tethers 308. The support structure 302 is configured to store the extension rails 306 when the extension rails 306 are not being used to extend the ripping capacity of the table saw 300. The extension rails 306 and 307 are connected to the table saw 300 via the tethers 308, which are secured to the support structure 302 at a position so that the extension rails 308, when not mounted with the table saw 300, hang via the tethers 308 out of the way from the working surface 304. The first extension rail 306 is unmounted from the working surface 304, and the second extension rail 307 is in a mounted position. In some embodiments, the tethers 308 are connected to the rails 306, 307 at an external location. In some embodiments, the tethers 308 are connected to the rails 306, 307 at an internal location, such as via a connecting end or via a hole into an interior of the rails.

In some embodiments, the tethers 308 are formed from a stretchable elastic material that biases the extension rails 306 toward the support structure 302. In some embodiments, the support structure 302 is configured to retract the tethers 308. In some embodiments, the tethers 308 are removable from the support structure 302 and/or the rails 306.

Figure 8:
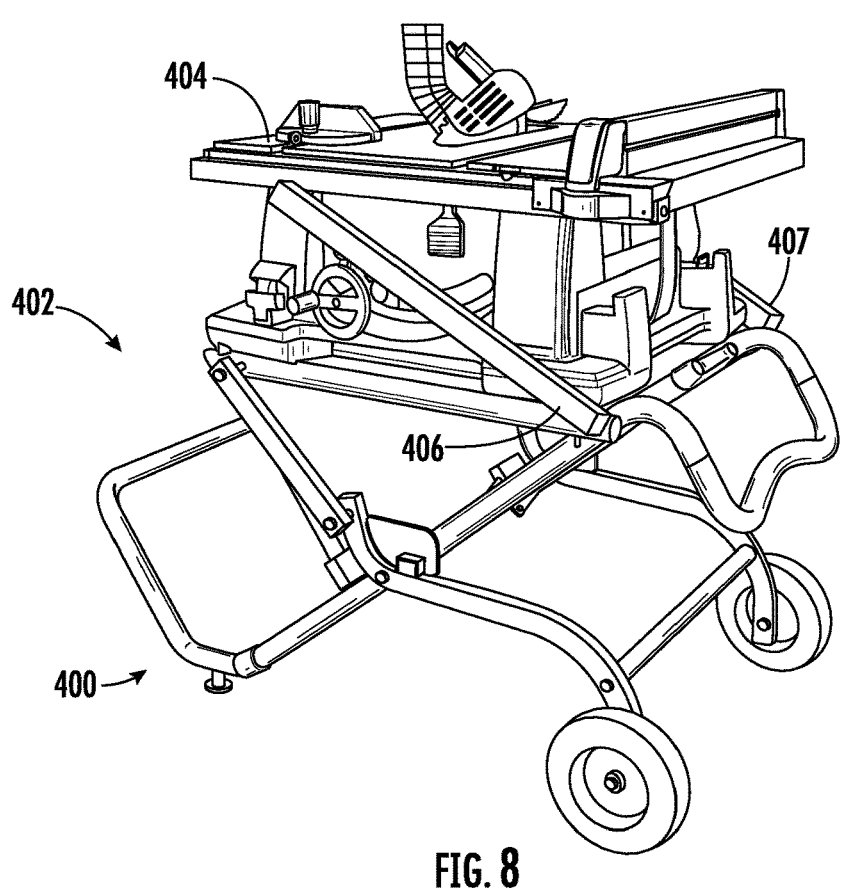

FIG. 8 depicts another exemplary embodiment of a table saw 400 according to this disclosure that includes a support structure 402, a working surface 404, and extension rails 406 and 407. The support structure 402 is configured to receive the extension rails 406, 407 when the extension rails 406, 407 are not being used to extend the ripping capacity of the table saw 400. In this embodiment, the support structure 402 and extension rails 406, 407 are configured such that, when the extension rails 406, 407 are mounted with the support structure 402, the extension rails 406, 407 provide additional support for the working surface 404. In some embodiment, the extension rails 406, 407 act as braces for the working surface 404 and/or the support structure 402. In some embodiments, the extension rails 406, 407 act as additional legs for the table saw 400. In some embodiments, the table saw 400 is at least partially collapsible, and the support structure 402 is configured to receive the extension rails 406, 407 at a position that does not interfere with the collapsing and setup of the table saw 400.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the disclosure.

What is claimed is:

1. A rail system for a table saw, comprising:
a first rail defining a first longitudinal axis and including a first planar upper guide surface, the first rail having a supporting end that includes:
  a first axial end face oriented substantially perpendicular to the first longitudinal axis;
  a supporting portion that extends axially from the first axial end face, the supporting portion having:
    an upwardly-facing support surface; and
    a lower surface that defines a notch;
a second rail defining a second longitudinal axis and including a second planar upper guide surface, the second rail having a connecting end that includes:
  an interior that defines an open space configured to receive the supporting portion of the supporting end of the first rail;
  a second axial end face that defines an opening through which the supporting portion is guided into the open space, the second axial end face being oriented substantially perpendicular to the second longitudinal axis;
  an internal support member extending along on upper portion of the interior of the connecting end such that the internal support member is positioned above the supporting portion of the first rail when the supporting portion is received in the open space, the internal support member having a downwardly-facing support surface; and
  a connection mechanism including:
    a locking member positioned in the interior and configured to engage the notch in the lower surface of the supporting portion of the first rail; and
    an actuator extending through a lower wall of the second rail, the actuator having a first end attached to the locking member in the interior and a second end located externally with respect to the second rail, the actuator being configured to move the locking member into and out of engagement with the notch when the supporting portion of the supporting end of the first rail is received in the open space in response to the second end of the actuator being manipulated by a user of the rail system,
wherein, (i) when the supporting portion is received in the open space and (ii) the locking member is moved upwardly into engagement with the notch, the upwardly-facing support surface of the supporting portion is pressed against the downwardly-facing support surface of the internal support member thereby clamping the supporting portion between the locking member and the internal support member, and
wherein, when the supporting portion is clamped between the locking member and the internal support member, the first planar upper guide surface and the second planar upper guide surface are co-planar.

2. The rail system of claim 1, wherein the locking member has a first convex portion and a second convex portion that together define a convex locking head of the locking member, the first convex portion facing inwardly with and the second convex portion facing outwardly with respect to the interior of the connecting end of the second rail,
wherein the lower surface of the supporting portion includes a first concave portion and a second concave portion that together define the notch, the first concave portion facing inwardly from the supporting end and the second concave portion facing outwardly from the supporting end,
wherein, when the locking member is moved upwardly into engagement with the notch, the first convex portion of the locking member contacts the first concave portion of the notch.

3. The rail system of claim 2, wherein continued upward movement of the locking member while the first convex portion of the locking member is positioned in contact with the first concave portion of the notch (i) causes the upwardly-facing support surface of the supporting portion to be pressed upwardly into engagement with the downwardly-facing support surface of the internal support member, and (ii) causes the first rail to be moved longitudinally toward the second rail until the first axial end face is pressed against the second axial end face, and
wherein, when the upwardly-facing support surface of the supporting portion is pressed against the downwardly-facing support surface of the internal support member and the first axial end face is pressed against the second axial end face, the first planar upper guide surface and the second planar upper guide surface are co-planar.

4. The rail system of claim 1, wherein the second rail includes a supporting end opposite the connecting end, the supporting end of the second rail being identical to the supporting end of the first rail.

5. The rail system of claim 1, wherein the first planar upper guide surface and second planar upper guide surface are configured to guide and support a rip fence.

6. A table saw comprising:
a working surface that includes:
  a front edge and a rear edge extending along a longitudinal axis; and
  an opening for a blade oriented perpendicularly to the front and rear edges;
a first stationary rail mounted along the front edge of the working surface, the first stationary rail including a stationary rail guide surface and having a supporting end that includes:
  a first axial end face oriented substantially perpendicular to the first longitudinal axis;
  a supporting portion that extends axially from the first axial end face, the supporting portion having:
    an upwardly-facing support surface; and
    a lower surface that defines a notch;
a first extension rail including an extension rail guide surface, the first extension rail having a connecting end that includes:
  an interior that defines an open space configured to receive the supporting portion of the supporting end of the first stationary rail;
  a second axial end face that defines an opening through which the supporting portion of the supporting end of the first stationary rail is guided into the open space, the second axial end face being oriented substantially perpendicular to the longitudinal axis;
  an internal support member extending along on upper portion of the interior of the connecting end such that the internal support member is positioned above the supporting portion of the first stationary rail when the supporting portion is received in the open space, the internal support member having a downwardly-facing support surface; and a connection mechanism including:
- a locking member positioned in the interior and configured to engage the notch in the lower surface of the supporting portion of the first rail; and
- an actuator extending through a lower wall of the first extension rail, the actuator having a first end attached to the locking member in the interior and a second end located externally with respect to the first extension rail, the actuator being configured to move the locking member into and out of engagement with the notch when the supporting portion of the supporting end of the first stationary rail is received in the open space in response to the second end of the actuator being manipulated by a user of the rail system, wherein, (i) when the supporting portion of the first extension rail is received in the open space and (ii) the locking member is moved upwardly into engagement with the notch, the upwardly-facing support surface of the supporting portion is pressed against the downwardly-facing support surface of the internal support member thereby clamping the supporting portion between the locking member and the internal support member, and wherein, when the supporting portion is clamped between the locking member and the internal support member, the stationary rail guide surface and the extension rail guide surface are co-planar.

7. The table saw of claim 6, further comprising:
a second stationary rail mounted along the rear edge of the working surface, the second stationary rail having a supporting end that is identical to the supporting end of the first stationary rail; and
a second extension rail having a connecting end that is identical to the connecting end of the first extension rail.

8. The table saw of claim 7, further comprising a support structure that supports the working surface, and
wherein the first extension rail and the second extension rail are each configured to be attached to the support structure when not in use.

9. The table saw of claim 8, wherein the first extension rail and the second extension rail are each attached to the support structure by a respective flexible tether.

10. The table saw of claim 6, wherein the locking member of the first extension rail has a first convex portion and a second convex portion that together define a convex locking head of the locking member, the first convex portion facing inwardly with and the second convex portion facing outwardly with respect to the interior of the connecting end of the first extension rail, wherein the lower surface of the supporting portion of the supporting end of the first stationary rail includes a first concave portion and a second concave portion that together define the notch, the first concave portion facing inwardly from the supporting end and the second concave portion facing outwardly from the supporting end, wherein, when the locking member is moved upwardly into engagement with the notch, the first convex portion of the locking member contacts the first concave portion of the notch.

11. The table saw of claim 10, wherein continued upward movement of the locking member while the first convex portion of the locking member is positioned in contact with the first concave portion of the notch (i) causes the upwardly-facing support surface of the supporting portion to be pressed upwardly into engagement with the downwardly-facing support surface of the internal support member, and (ii) causes the first stationary rail and the first extension rail to be moved longitudinally toward each other until the first axial end face is pressed against the second axial end face, and wherein, when the upwardly-facing support surface of the supporting portion is pressed against the downwardly-facing support surface of the internal support member and the first axial end face is pressed against the second axial end face, the stationary rail guide surface and the extension rail guide surface are co-planar.

* * * * *